US009407689B1

(12) United States Patent
Casares et al.

(10) Patent No.: US 9,407,689 B1
(45) Date of Patent: Aug. 2, 2016

(54) PHYSICAL VERIFICATION FOR ONLINE CHECK-IN

(75) Inventors: Wenceslao Casares, Woodside, CA (US); Federico H. Murrone, Buenos Aires (AR); Shan Mehta, San Francisco, CA (US); Doron Gavra, Palo Alto, CA (US); Meyer Malka, Menlo Park, CA (US)

(73) Assignee: Lemon, Inc., Tempe, AZ (US)

(*) Notice: Subject to any disclaimer, the term of this patent is extended or adjusted under 35 U.S.C. 154(b) by 0 days.

(21) Appl. No.: 13/275,207

(22) Filed: Oct. 17, 2011

Related U.S. Application Data

(60) Provisional application No. 61/394,324, filed on Oct. 18, 2010, provisional application No. 61/305,925, filed on Feb. 18, 2010, provisional application No. 61/373,205, filed on Aug. 12, 2010.

(51) Int. Cl.
*H04L 29/08* (2006.01)
*H04L 29/06* (2006.01)
*G06Q 30/02* (2012.01)

(52) U.S. Cl.
CPC ............... *H04L 67/10* (2013.01); *G06Q 30/02* (2013.01); *G06Q 30/0255* (2013.01); *H04L 65/403* (2013.01)

(58) Field of Classification Search
CPC ....... H04L 67/10; H04L 65/403; H04L 67/306; G06Q 30/02; G06Q 30/0255
USPC ................... 709/204, 206, 203, 205; 705/34
See application file for complete search history.

(56) References Cited

U.S. PATENT DOCUMENTS

| 8,554,670 B1* | 10/2013 | Blank et al. ................... 705/39 |
| 2008/0070593 A1* | 3/2008 | Altman ................ H04L 63/102 455/457 |
| 2008/0103972 A1* | 5/2008 | Lanc .............................. 705/44 |
| 2009/0240564 A1* | 9/2009 | Boerries et al. ................ 705/10 |
| 2010/0063892 A1* | 3/2010 | Keronen et al. ................ 705/26 |

* cited by examiner

*Primary Examiner* — Vivek Srivastava
*Assistant Examiner* — Normin Abedin
(74) *Attorney, Agent, or Firm* — Baker & McKenzie LLP (57) ABSTRACT

Disclosed are methods and systems for providing physical verification for an online check-in process. The system and method provides an application at a merchant terminal by which a user at the merchant can check-in to an online application, such as through an near-field communication or NFC chip. A remote automated transaction system receives users' check-in information and in turn can transmit that information to a social network computer system, whereby the user's status is automatically updated with at least some of the transmitted check-in information.

14 Claims, 11 Drawing Sheets

Customer Dashboard

| | Dashboard | Treasure Chest | Make a Gift | Favorite Biz 612 | Transactions |

🔍 Search Biz

614 →

| Biz | Total Saved | Total Visits | Total Spent | Avg Spent | Frequency |
|---|---|---|---|---|---|
| Slider Bar | $348.43 | 15 | $728.32 | $12.34 | 5 x month |
| Coupa Cafe | $348.43 | 15 | $728.32 | $12.34 | 5 x month |
| Cafe Epi | $348.43 | 15 | $728.32 | $12.34 | 5 x month |

616 →

| Biz | When | How much? | Saved |
|---|---|---|---|
| Coupa Cafe | few minutes ago | $13.45 | not this time |
| Coupa Cafe | 2 hours ago | $7.23 | $5 saved 2ith coupon! |
| Coupa Cafe | Sep 23 11:45pm | $16.00 | $15 saved with promo! |
| Coupa Cafe | Sep 23 11:45pm | $16.00 | Fede paid this! |

610 →

Coupa Cafe
Restaurant
164 University Ave
94301 CA

You have a $5 coupon for this place!

20% off on Weekends (promos)
Text COUPACAFE11 to 78787 and get $8 off!

| facebook | Cerca | 🔍 | | |
|---|---|---|---|---|
| | Yoda's Cantina 712 | | | Welcome, Doron Log off |
| Home | Promotions | Customers | Transactions | Support | My account |

Customers — 714

See which other stores your customers buy from

Filter: By group ▼ | By age ▼ | By sex ▼ | By average spent ▼

Search by name (opt): [____________]  [Search customers]

Period: ● Total period  ○ Last month  ○ Last week  ○ Today  [02/23/09 – 10/02/10 ▼]

| ☐ Customers ▶ | Total spent ▶ | Coupons redeemed ▶ | Total visits ▶ |
|---|---|---|---|
| ☐ 👤 Nicolas Visiers  Last visit: Yesterday  [A] | $ 655.23 | 5 | 5 |
| ☐ 👤 Wenceslao Casares  Last visit: Yesterday  [A] | $ 225.23 | 5 | 5 |
| ☐ 👤 Nicolas Visiers  Last visit: Today  [B] | $ 255.23 | 2 | 2 |
| ☐ 👤 Wenceslao Casares  Last visit: 06/12/10  [B] | $ 25.23 | 3 | 3 |

| facebook | Cerca | 🔑 | | | |
|---|---|---|---|---|---|
| 732 — Yoda's Cantina | | | | | |
| Home | Promotions | Customers | Transactions | Support | My account |

Your promotions  734 ⤵  ⊕ Add a new promotion

1. Customer loyalty ⓘ

| | | it started | it expires | Results |
|---|---|---|---|---|
| $3.00 off ▾ on 2nd purchase | | 02/23/09 | Never | 843 coupons |

Actions: Save

| ● with | 5 visits ▾ | of | $5.00 or more ▾ | 02/23/09 | Never | No results |

○ after spending  $50.00 or more ▾

Actions: Save

2. Anytime anyday ⓘ

| | | it started | it expires | Results |
|---|---|---|---|---|
| 20% off ▾ Weekdays dinner | | 10/01/10 | 10/30/10 | 727 coupons |

Actions: Save | De-activate
View de-activated anytime anyday promotions

Add an anytime anyday promotion

3. Special offers for acquiring new clients ⓘ

| | | it started | it expires | Results |
|---|---|---|---|---|
| 20% off ▾ Weekdays dinner | | 10/01/10 | 10/30/10 | 727 coupons |

Actions: Save | De-activate
View de-activated special offers

Add an special offer

PHYSICAL VERIFICATION FOR ONLINE CHECK-IN

CROSS-REFERENCE TO RELATED APPLICATIONS

This patent application claims priority to U.S. Provisional Patent Application Ser. No. 61/394,324, entitled "Physical verification for online check-in," filed Oct. 18, 2010, the entirety of which is herein incorporated by reference. This patent application also relates to provisional patent application 61/305,925, entitled "Automated transaction system," filed Feb. 18, 2010, and to provisional patent application 61/373,205, entitled, "Settlement processes in an automated payments system," filed Aug. 12, 2010, which are both herein incorporated by reference in their entirety for all purposes.

TECHNICAL FIELD

The disclosed embodiments relate generally to implementing physical verification for online check-in processes and functions using an automated transaction system.

SUMMARY

This disclosure relates to implementing a physical mechanism to transmit information about a user to an online system, including social networking websites, such as Facebook, using an automated transaction system. Such action may be initiated at a merchant location via a user tapping, waving, scanning, or placing in close proximity a Near Field Communication (NFC) chip, whether on its own or as part of another device) to an NFC chip reader. User information may be received at an automated transaction system for verification and for updating information and data relating to the user information. The physical mechanism may be used to initiate transmission of user information via the automated transaction system to create new membership in an online system, verify existing membership in an online system, and enabling publication with or to an online system (such as liking or checking in at a business). Any such use of the physical mechanism and automated transaction system in this application is referred to as a "check-in."

DETAILED DESCRIPTION

Figure 1:
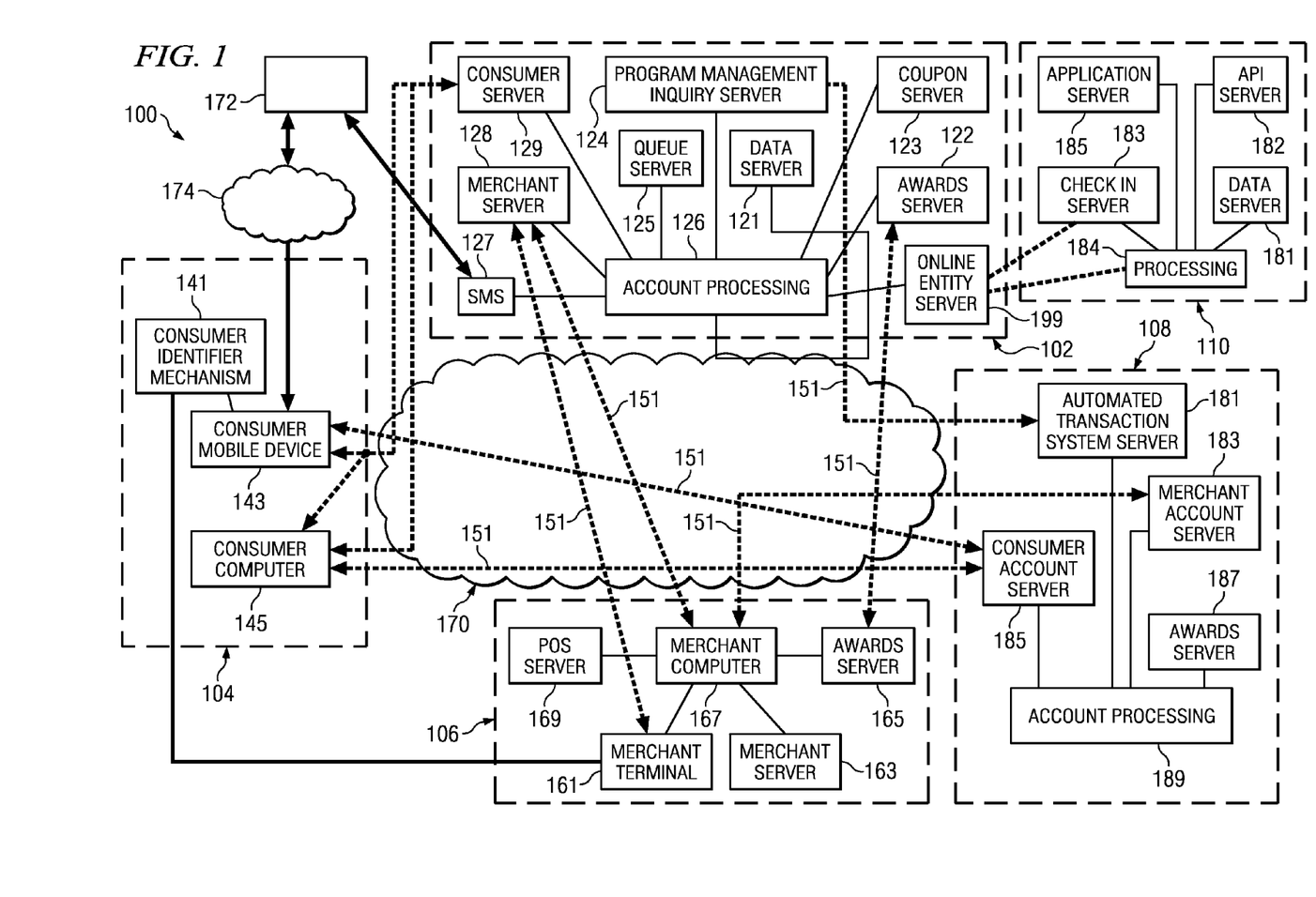
FIG. 1 is a schematic diagram illustrating an automatic transaction system, in accordance with the present disclosure.

FIG. 1 is a schematic diagram illustrating an automated transaction system 100. The automated transaction system 100 may be used for a variety of online systems 110 desiring to create, verify or determine users of their online networks and systems in the offline world. The online systems 110 may include social networking systems, publication systems or networks, or other online systems in which user verification may be advantageous (e.g., Facebook, Twitter, Foursquare, Open Table, Yelp, Living Social, Groupon, etc.).

The automated transaction system 100 may also be used for program managers 108 (including, but not limited to, depository institutions like banks and credit unions) and merchants 106 desiring to facilitate transactions. These transactions may include payment transactions, coupon redemption, reward or promotional transactions, mileage transactions, or any other type of transaction or exchange that may take place between a customer and merchant.

The automated transaction system 100 may include multiple components to initiate and complete a variety of exchanges, transactions, verification, check-ins, etc. A consumer identifier mechanism 141 is used for consumers to initiate these check-ins at participating merchant locations. A merchant terminal 161 may be used to read the consumer identifier mechanism 141. The merchant terminal 161 may just be a reader or terminal connected to the automated transaction system network and be operable to scan or read the consumer identifier mechanism 141 and verify the user. In other embodiments, the terminal 161 is also a point-of-sale (POS) terminal used for merchants to accept transactions from participating consumers using a consumer identifier mechanism 141.

An automated transaction system is a communications system connecting consumer and merchant transactions to online systems 110 for user verification and determination purposes. In some embodiments, the automated transaction system may also connect consumers and merchants to program managers' systems 108 for transaction processing and settlement.

Communications between consumer systems 104, merchant systems 106, online systems 110, and program manager systems 108 may be facilitated through the automated transaction system via the Internet, a cloud computing network, or other public communication networks 170. Although a single consumer system 104, merchant system 106, online system 110, and program manager system 108 are shown, there may actually be a plurality of consumer systems 104, merchant systems 106, online system 110, and program manager systems 108 in communication with the automated transaction system.

The consumer system 104 may include a consumer mobile device 143, a consumer computer 145, and/or a consumer identifier mechanism 141. In an embodiment, the consumer identifier mechanism 141 is attached to the consumer mobile device 143, but the consumer identifier mechanism 141 may be used separately from a consumer mobile device 143. The consumer identifier mechanism 141 is used to communicate 150 (e.g., via NFC) with a merchant terminal 161. Thus, the consumer identifier mechanism 141 may be attached to a consumer's items that they typically carry (e.g., keys, wallet, mobile device, planner, etc.) or may be carried separately by the consumer. The consumer computer 145 may be a personal computer providing the consumer access a number of program manager websites (e.g., a personal banking site or an airline miles site) and/or automated transaction system websites and dashboards. A consumer may access various aspects related to her account at the automated transaction system via the consumer computer 145. For example, the automated transaction system may provide a consumer website over the Internet 170 providing content for the consumer's transactions, available rewards, coupons, memberships, etc. The consumer may also be able to access merchant websites via the Internet.

Connections 151 (indicated by a dotted line) are exemplary connections between the consumer system 141, merchant system 161, program manager system 108, online system 110, and automated transaction system, but other connections may be possible.

The merchant system 106 may include a merchant terminal 161 (which may be a reader or a reader/POS terminal combination), a POS server 169, a merchant computer system 167, an awards server 165, and a merchant server 163. The POS server 169 may be used for storing information and for processing space for POS transactions at the merchant terminal 161. The awards server 165 may be used for storing information for merchant reward, award, coupon, etc. information, and to process related programs. In an embodiment, an awards server 122 is located at the automated transaction system and a merchant computer 167 may access this awards server 122 to determine merchant reward, award, coupon, etc. information and to process related programs once a user's information is verified. In another embodiment, both the merchant system 106 and the automated transaction system have awards servers 122, 165. The merchant server 163 may be used for storing other merchant-related information including marketing information, HR records, accounting, etc., and executing or processing related programs.

The merchant computer 167 may also provide the merchant access to a number of websites (e.g., a business banking site). A merchant may also access various aspects related to merchant and customer accounts at the automated transaction system via the merchant computer 167. For example, the automated transaction system may provide a merchant website portal over the Internet 170 providing content for the merchant's transactions, available rewards, coupons, memberships, etc. The merchant may also be able to access consumer data including, but not limited to, data warehouse analytics, at the automated transaction system's data server 121.

The separate machines for the POS server 169, merchant computer system 167, awards server 165, and merchant server 163 are for illustration purposes only. The servers and computer system may all be encompassed within one machine or may be a group of networked machines. The merchant terminal 161 may be networked with the merchant computer system and servers.

When a check-in is initiated by a consumer via his consumer identifier mechanism 141 at a merchant terminal 161, the merchant system 161 may transmit information to and access information from the automated transaction system. For example, when a consumer uses his consumer identifier mechanism 141 to check-in for coupon redemption, the merchant system 161 may access the automated transaction system's coupon server 123 to determine whether the coupon is valid for that user and how much the coupon is worth. Alternatively, the merchant may have coupon validity and value information stored at the merchant server 163 and may access the automated transaction system's coupon server 123 to link the consumer identifier mechanism 141 with the coupon and with the consumer's account. The automated transaction system may facilitate an automatic check-in using the consumer information, merchant information, online system information, and, optionally, associated financial institution or program manager information. Similar levels of involvement are in place for other types of check-ins. The automated transaction system may be flexible depending on each consumer, merchant, online system and, optionally, program manager to provide as little or as much check-in information and processing as is used by a particular check-in.

The program manager system 108 may include an automated transaction system server 181, a merchant account server 183, a consumer account server 185, an awards server 187 and an account processor 189. The program manager system 108 may be a financial institution system with servers 185, 183 for consumers and businesses. The account processor 189 may process transactions and update information related to consumers, merchants, and awards at the servers 185, 183, 187. The automated transaction system server may store information related to the automated transaction system and the automated transaction system may access and update the automated transaction system server 181 during a transaction.

The separate machines for the automated transaction system server 181, the merchant account server 183, the consumer account server 185, the awards server 187 and the account processor 189 are for illustration purposes only. The servers and computer system may all be encompassed within one machine or may be a group of networked machines.

The automated transaction system may include a consumer server 129, merchant server 128, SMS server 127, program management inquiry server 124, queue server 125, coupon server 123, awards server 122, data server 121, online system server 199, and account processor 126. The automated transaction system facilitates transactions, check-ins and check-in related communications between the consumer system 104, merchant system 106, the online system 110, and, in some embodiments, the program management system 189. The consumer server 129 may store data related to a number of consumer accounts and execute consumer-related programming. The merchant server 128 may store data related to a number of merchant accounts and execute merchant-related programming. The SMS server 127 may communicate with any cellular network provider 172 to provide alerts to a consumer mobile device 142 via such cellular network 174. The program management inquiry server 124 may store data related to program management inquiries and execute program management inquiry-related programming. The online system server 199 may store data related to online system queries and execute online system-related programming. The queue server 125 may store data related to queue management and execute related programming. The coupon server 123 may store data related to coupons and execute related programming. The awards server 122 may store data related to awards and rewards and execute related programming. And the data server 121 may store aggregated data related to consumer and merchant transactions and check-ins as well as execute data warehouse analytics programming. Other servers may be possible including any servers related to consumer-merchant transactions, exchanges, or check-ins.

The separate machines for the consumer server 129, merchant server 128, SMS server 127, program management inquiry server 124, queue server 125, coupon server 123, awards server 122, data server 121, online system server 199, and account processor 126 are for illustration purposes only.

The servers and computer system may all be encompassed within one machine or may be a group of networked machines.

The online system 110 is a system offering social networking capabilities, such as liking a merchant, publishing the fact that a user is at a merchant's location, applying a coupon, checking a user or consumer in at a restaurant, updating a user's status, publishing a photo, writing on a merchant's wall, joining an online group, attending an event, tagging, poking, tweeting, etc., or any action facilitated by an online system having users. The automated transaction system associates a user scanning, tapping, waving, or placing in close proximity a NFC chip (of a consumer identifier mechanism) to an NFC chip reader with an online system 110. User information may be received at an automated transaction system for verification and for updating information and data relating to the user information and may be relayed to an online system 110 for any of the above actions. The automated transaction system may also facilitate a transaction between the user, merchant, and a program manager or financial institution and may also relay transaction information to the online system 110.

The online system 110 may include a data server 181, API server 182, application server 185, and a check-in server 183 (which provides the storage and programming capabilities for any type of online check-in including, but not limited to, adding a photo, tagging a photo, writing on a wall, updating a status, sending a tweet, "liking" a website, news, a brand, a company, a page, etc., joining a group, attending an event, redeeming a coupon or reward, checking in for a reservation, or any other user interaction with an online system). The online system 110 may also include a processing machine 184.

The separate machines for the data server 181, API server 182, application server 185, check-in server 183, and processing machine 184 are for illustration purposes only. The servers and computer system may all be encompassed within one machine or may be a group of networked machines.

As discussed in U.S. Prov. Pat. App. No. 61/305,925, in an embodiment, the consumer identifier mechanism 141 may be a sticker attached to a mobile device. A consumer may initiate contactless transactions with a merchant at the point of sale by tapping the consumer identifier mechanism 141 on a merchant terminal 161. The consumer identifier mechanism 141 initiates a payment through the transaction system.

The automated transaction system is operable to conduct a check-in in the automated transaction system 100. The automated transaction system directs check-in processes over the automated transaction system 100.

In an embodiment, after the consumer identifier mechanism 141 is tapped on the merchant terminal 161, the transaction system issues instructions to the online system 110 that result in the consumer identifier mechanism 141 user creating a new or being associated with an existing online system account, reservation, reward, or coupon. In another embodiment, after the consumer identifier mechanism 141 is tapped on the merchant terminal 161, the transaction system issues instructions to the online system 110 resulting in consumer identifier mechanism 141 user check-in information being published at an online system. In another embodiment, after the consumer identifier mechanism 141 is tapped on the merchant terminal 161, the transaction system issues instructions 110 that result in the consumer identifier mechanism 141 user receiving a coupon associated with the online system 110, a merchant 106, or both.

Figure 2:
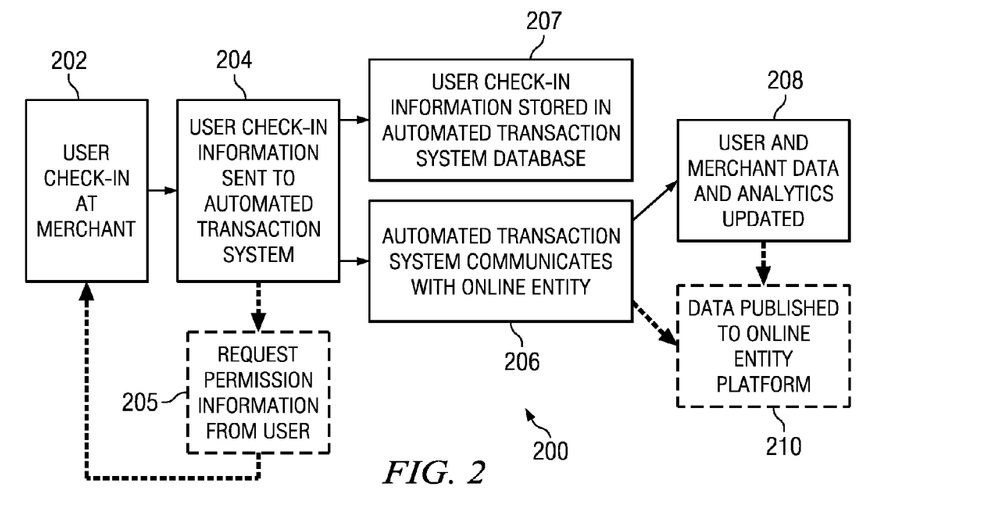
FIG. 2 is a flow diagram illustrating physical verification for online check-in processes, in accordance with the present disclosure.

FIG. 2 is a flow diagram illustrating physical verification for online check-in processes. At action 202, a user checks in at a merchant venue. The check-in may include a user tapping, waving, scanning, or placing in close proximity an NFC chip to an NFC chip reader. The check-in may occur at a reader or terminal that only performs a check-in function or at a reader or terminal also operable to conduct transactions.

At action 204, user check-in information is sent to an automated transaction system. The user check-in information may include date, time, transaction amount, terminal/reader location, merchant information, and user identifier mechanism information.

Optionally, the automated transaction system may request permission information from the user at action 205. The permission information may include asking the user whether they want to check in. If the user indicates yes, then the user may be checked into pre-approved online systems. The request for permission information may also include a text message to the user's mobile device requesting a yes/no from the user as to whether the user may want to publish her location at a specific online system (e.g., Facebook) application associated with the merchant. The user's response is then sent to the automated transaction system at action 204.

The user's check-in information—optionally including the user's permission information—is stored in a database at the automated transaction system in action 207. The user's check-in information or a compilation of the user's data stored in the database is available for viewing by the user by accessing a client browser interface for the automated transaction system.

The automated transaction system communicates with an online system based on check-in information at action 206. For example, if the user desires to have his location at a merchant published on Facebook, the automated transaction system will communicate the user's location at the merchant with Facebook for publication.

The user and merchant data and analytics are updated at action 208. For example, if the user indicated that the automated transaction system may always publish her location at a particular merchant, then the automated transaction system will update data accordingly. The automated transaction system may update a merchant's analytics based on the number of users arriving at the merchant. The automated transaction system may provide data and the online system may update their databases and records. For example, if a user checks-in at a restaurant, the automated transaction system may provide information to a reservation online system (e.g., Open Table) that the user has arrived for his reservation. The reservation online system may update his records or database indicating that the user arrived, arrived on time, etc. Other data and analytics may be updated depending on user inputs and preferences, online system options and functionalities, and merchant preferences.

Optionally, at action 210, data related to the user check-in information is published to the online system 110. For example, a user status may be published on Twitter or a user's location at a merchant may be published on the merchant's page on Facebook. In addition to the actions shown in FIG. 2, at any point after user check-in information is sent to the automated transaction system, information may be sent to the user. This information may include a coupon or reward for the merchant at which the user is checked in. The user may receive the information via message to her mobile device or via an online system account associated with her, or both.

Figure 3:
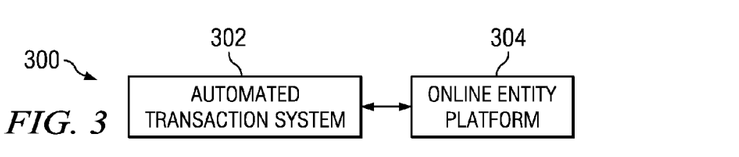
FIG. 3 is a schematic diagram illustrating communication between an automated transaction system and an online system or publication system, in accordance with the present disclosure.

FIG. 3 is a schematic diagram illustrating communication between an automated transaction system 302 and an online system platform 304. As discussed above, the automated transaction system 302 receives user check-in information for each user check-in. The automated transaction system 302 may communicate aspects of this user check-in information and/or associated information to the online system platform 304. This information may include, but is not limited to, user identification information, user geographic location, merchant or business data including the business name, a category for the business, etc., a transaction amount, SKU data, a user status, and other check-in information. As discussed in relation to FIG. 1, the online system platform 304 may include APIs for various online check-in functions. The online system platform 304 may also include automated transaction system applications and merchant applications.

Figure 4:
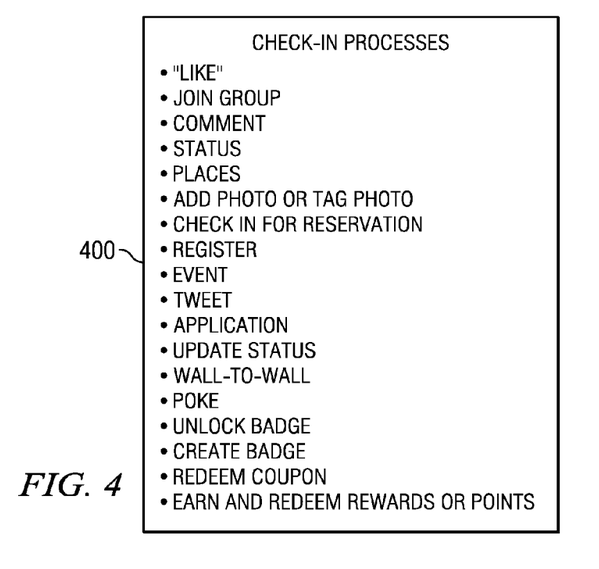
FIG. 4 is a schematic diagram illustrating check-in processes and functions, in accordance with the present disclosure.

FIG. 4 is a schematic diagram illustrating various check-in options or functions 400 for a variety of online systems. A user may "like" a merchant, news, page, event, group, etc.; a user may join a group; a user may make a comment; a user may indicate that they are at a particular place or business; a user may add a photo or tag a photo; a user may register; a user may check-in at a restaurant for his reservation; a user may attend an event; a user may post a status or tweet a message; a user may post on a wall; a user may poke another user; a user may unlock a badge; a user may create a custom badge; a user may redeem a coupon (e.g., with Groupon); a user may "like" a coupon offered by a merchant or by an online system; a user may earn and redeem rewards or points; a user may update a status; etc. If an online system supports a user interaction (or a type of check-in), then the automated transaction system may support this type of check-in.

Figure 5:
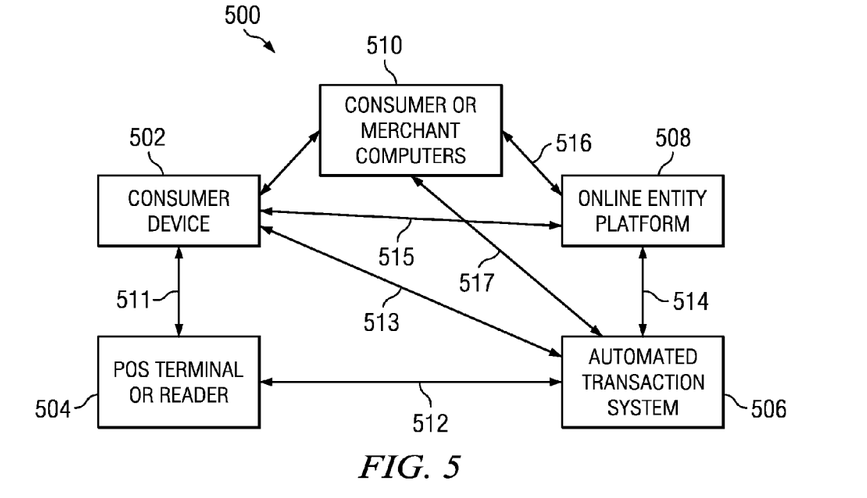
FIG. 5 is a system diagram of an automated transaction system, online system or publication system, NFC reader, user device, and system user computers, in accordance with the present disclosure.

FIG. 5 is a schematic diagram illustrating a check-in system 500. The check-in system 500 includes a consumer device 502 with a consumer identifier mechanism, a POS terminal or reader 504, an automated transaction system 506, and an online system platform 508. The system may also include consumer and/or merchant computers 510 running an interface provided by the automated transaction system 506. The consumer device 502 may be a mobile device, wallet with a smart card, stand-alone smart card, key chain, etc.

As discussed above, the consumer identifier mechanism comes in close proximity with the terminal or reader 504 to initiate the check-in (connection 511). Check-in information is passed from the terminal or reader 504 to the automated transaction system 506 (connection 512) via the internet or a network.

The automated transaction system 506 may request password, verification, permissions, check-in specifics, etc. from the user via the consumer mobile device 502 (connection 513). The user enters information related to the check-in (e.g., content for status updates) and the information is communicated to the automated transaction system 506 (connection 513). The automated transaction system 506 communicates the user-specific check-in information to the online system platform 508 (e.g., Facebook) (connection 514). The automated transaction system 506 may also communicate coupon, rewards, merchant updates (real-time and otherwise), etc. to the consumer device 502 (connection 513).

The consumer mobile device 512 may also communicate with the online system platform 508 directly either via browser or through messaging or e-mailing (connection 515). The automated transaction system 506 may update data and analytics and provide the content to the consumer and/or to the merchant on automated transaction system dashboards via a browser on the consumer and/or merchant computer 510 (connection 517). Although a single box 510 is shown in FIG. 5, the single box 510 represents any number of consumer or merchant computers. The consumer or merchant may access and update their account information, permissions, preferences, etc. with the automated transaction system 506 via the dashboards at the consumer or merchant computers 510 (connection 517).

Consumers or merchants may also communicate with the online system platform 508 directly via the consumer or merchant computers 510 (connection 516). Such communications may include social media updates or functions, making reservations, posting a coupon, acquiring a coupon, etc.

Thus, the automated transaction system 506 provides for associating a physical verifying of a user at a merchant (e.g., connection 511) with an online system platform 508. The automated transaction system 506 also provides for passing information between users, merchants, and online systems. The automated transaction system 506 may also connect these systems with a program manager (not shown) including, but not limited to, a financial institution for facilitating a transaction.

FIG. 6A-6E are schematic diagrams illustrating exemplary consumer dashboard pages 600, 610, 620, 630, 640 for providing automated transaction system data and analytics to a consumer or user.

Figure 6A:
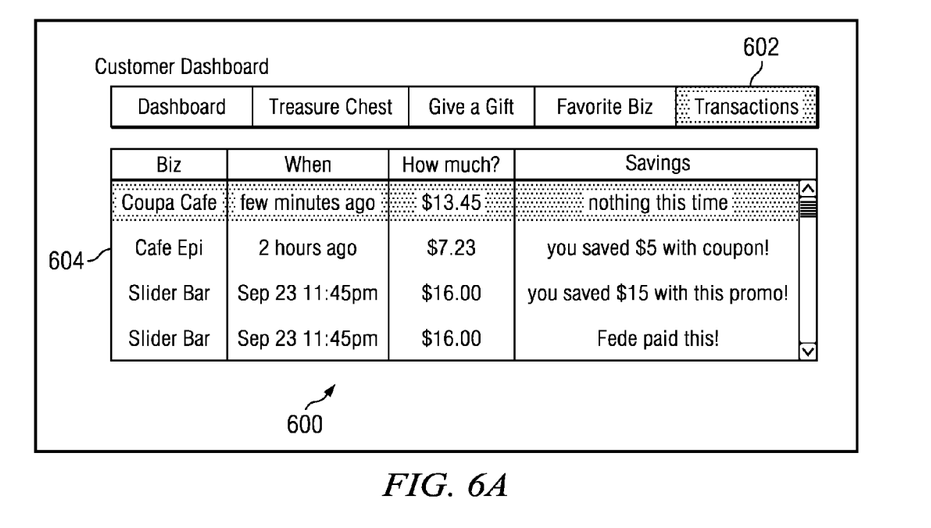
FIG. 6A-6E are schematic diagrams illustrating exemplary consumer dashboard pages for providing automated transaction system data and analytics to a consumer or user.

The consumer dashboard 600 illustrates data 604 provided when a user selects or navigates to a transactions option 602. The data 604 may include, but is not limited to, business information, date and time of purchase, visit, or check-in, transaction amount, and savings, reward, or coupon information for the transaction or check-in.

Figure 6B:
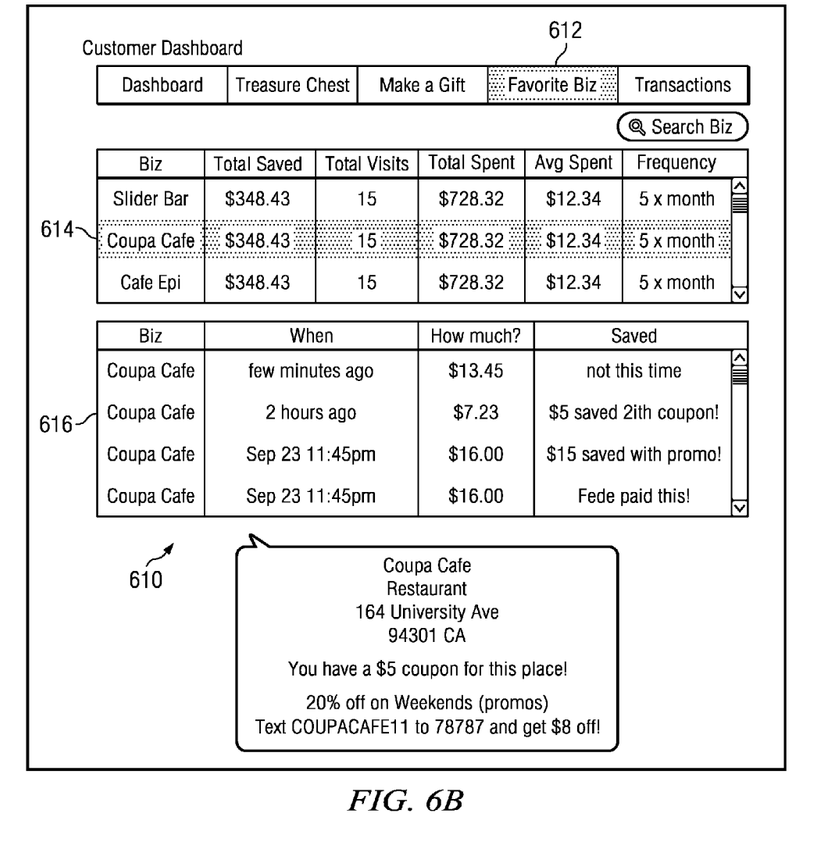

The consumer dashboard 610 illustrates data 614 provided when a user selects or navigates to a favorite business option 612. The data 614 may include, but is not limited to, business information, total savings, number of visits, total amount spent, average amount spent, and frequency of visits. The user may also select a certain favorite business from the data 614 and more detailed data 616 is provided to the user. The more detailed information may include, but is not limited to, business name, date and time of purchase/visit/check-in, transaction amount, and savings, reward, or coupon information used for the transaction or check-in.

Figure 6C:
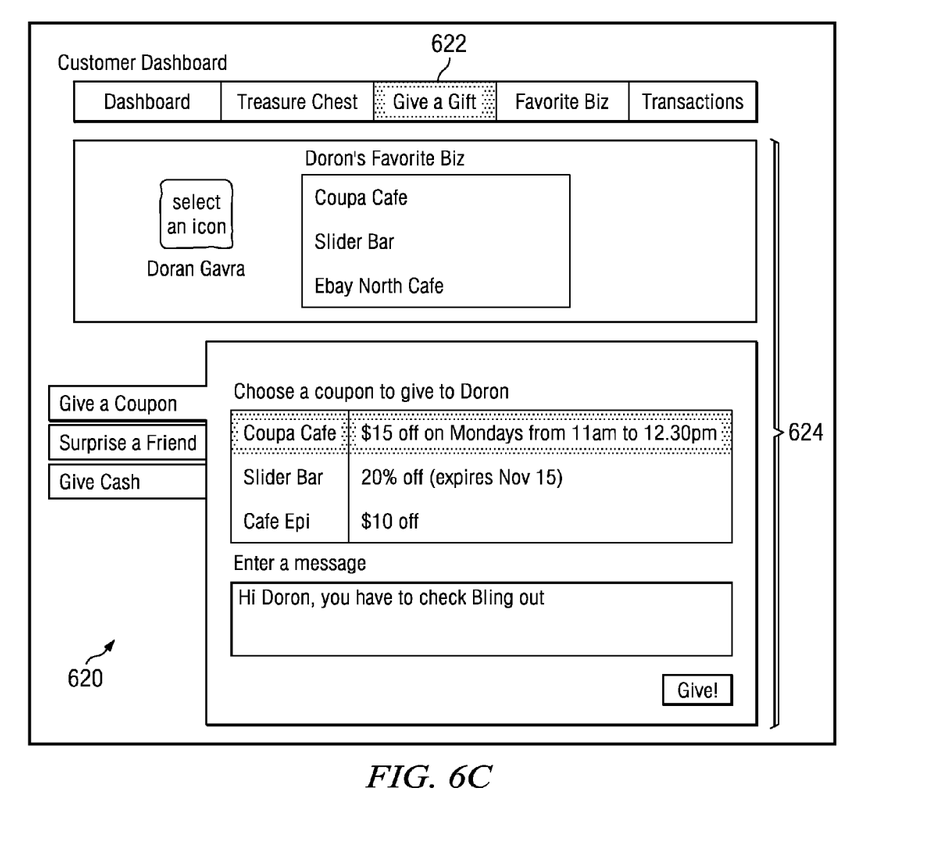

The consumer dashboard 620 illustrates data 624 provided when a user selects or navigates to a give a gift option 622. The data 624 may include, but is not limited to, favorite business information, coupon options, surprise options, cash options for gifts to friends. The user may also select a gift option from the data 624, enter a message, and send the gift to a friend.

Figure 6D:
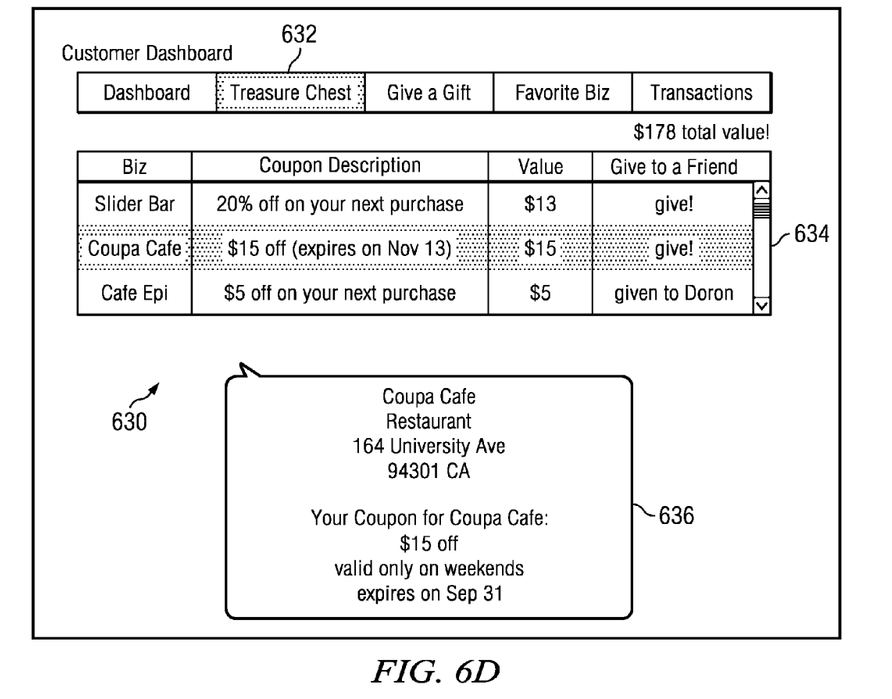

The consumer dashboard 630 illustrates data 634 provided when a user selects or navigates to a treasure chest option 632. The data 634 may include, but is not limited to, business name, available coupon or reward information, available coupon or reward value, and a give to a friend information. When a field of the data 634 is selected by a user, a graphic 636 may appear with a summary of the business information including the business's geographic information, business information, coupon information for that business specific to the user, etc.

Figure 6E:
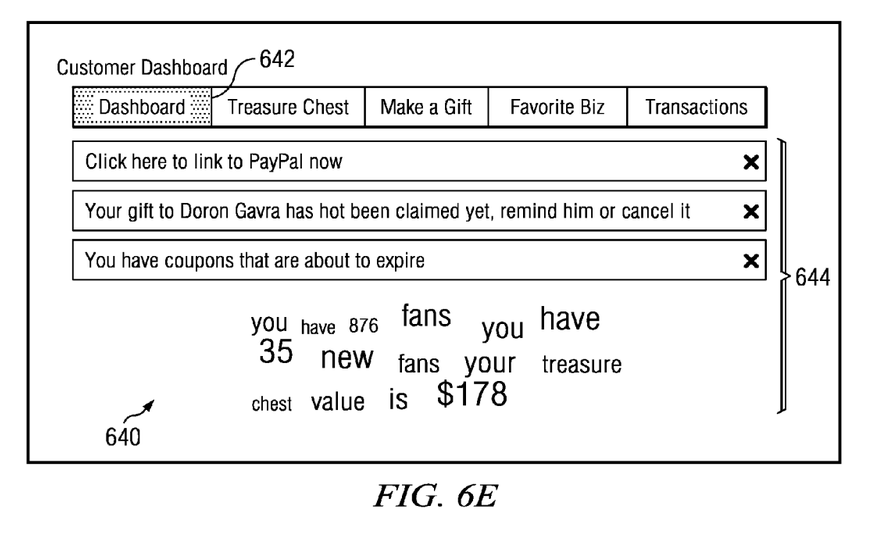

The consumer dashboard 640 illustrates data 644 provided when a user selects or navigates to a dashboard home 642. The data 644 may include, but is not limited to, a link for PayPal or other program manager, gift information, and coupon, reward, or promotion information.

FIGS. 7A-7E are a schematic diagrams illustrating exemplary merchant or business dashboard pages 700, 710, 720, 730, 740 for providing automated transaction system data and analytics to a merchant or business.

Figure 7A:
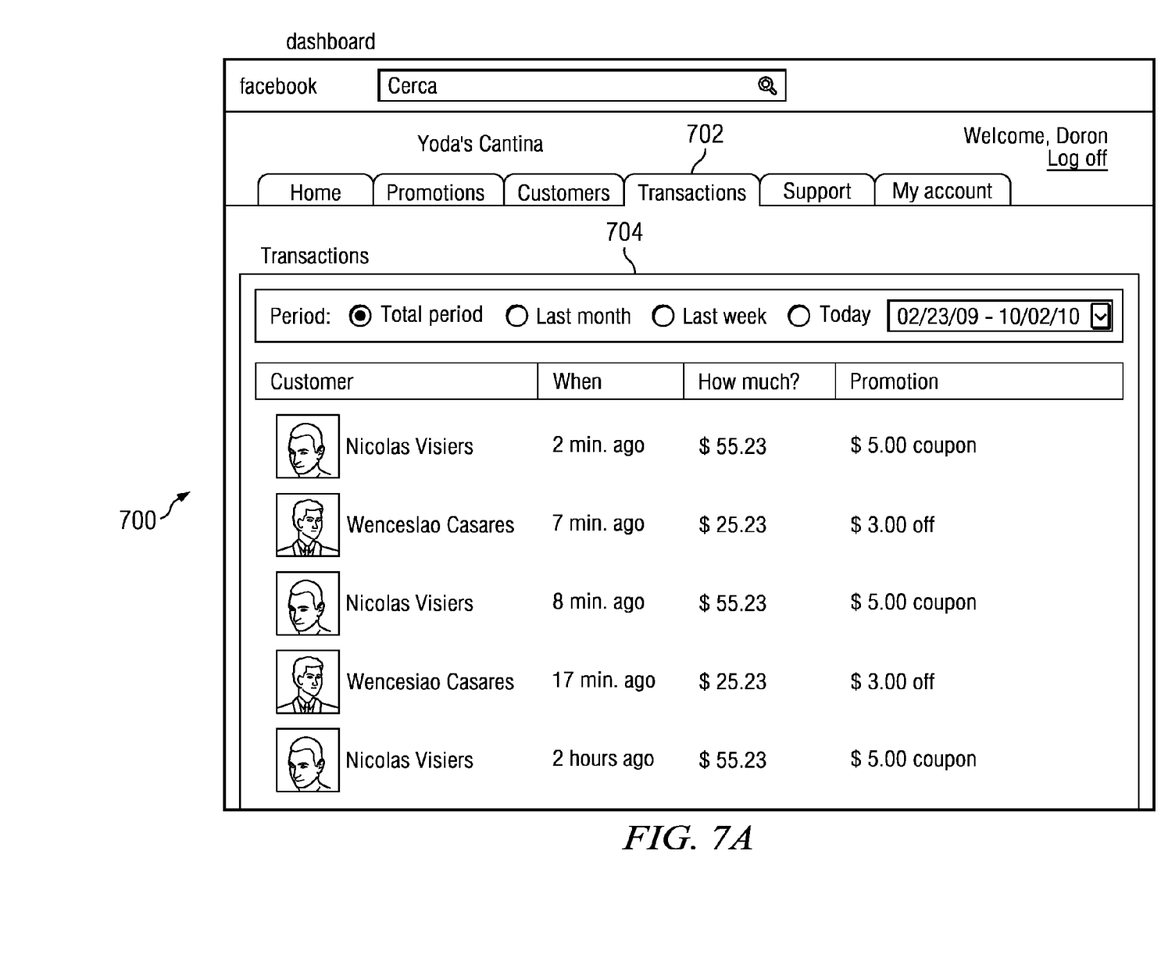
FIGS. 7A-7E are a schematic diagrams illustrating exemplary merchant or business dashboard pages for providing automated transaction system data and analytics to a merchant or business.

The business dashboard 700 illustrates data 704 provided when a business user selects or navigates to a dashboard transaction page 702. The data 704 may include, but is not limited to, customer information, when the customer checked in, whether and how much money the customer spent, whether the customer used a reward, coupon, or promotion and the value of that promotion. The data 704 may be displayed for a selectable period of time.

Figure 7B:
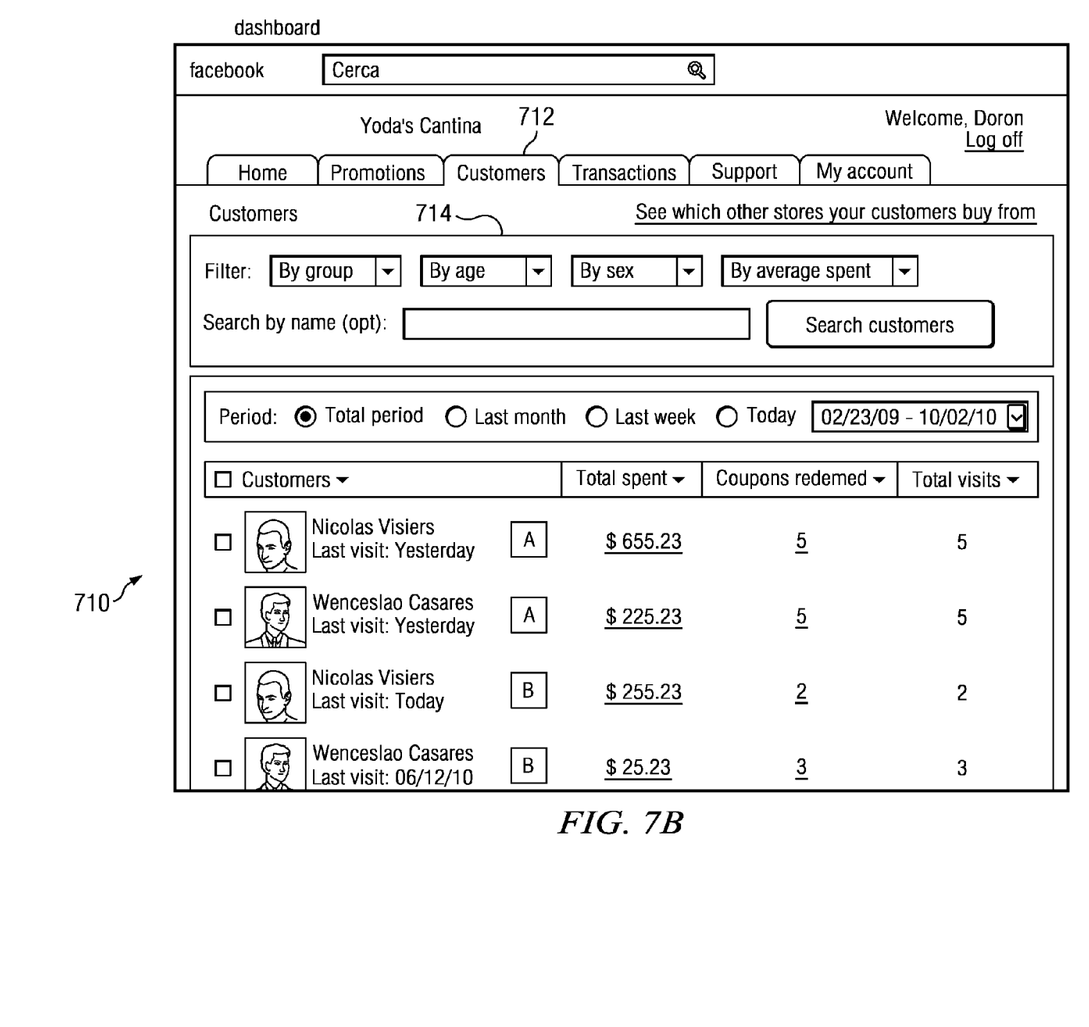

The business dashboard 710 illustrates data 714 provided when a business user selects or navigates to a dashboard customers page 712. The data 714 may include, but is not limited to, customer information, total amount spent, number of coupons redeemed total number of visits, when the customer checked in. The data 714 may be displayed for a selectable period of time and/or may be filtered by group, age, sex, average amount spent. The business user may also search by a customer name, generally when permission has been giving for this by the consumer.

Figure 7C:
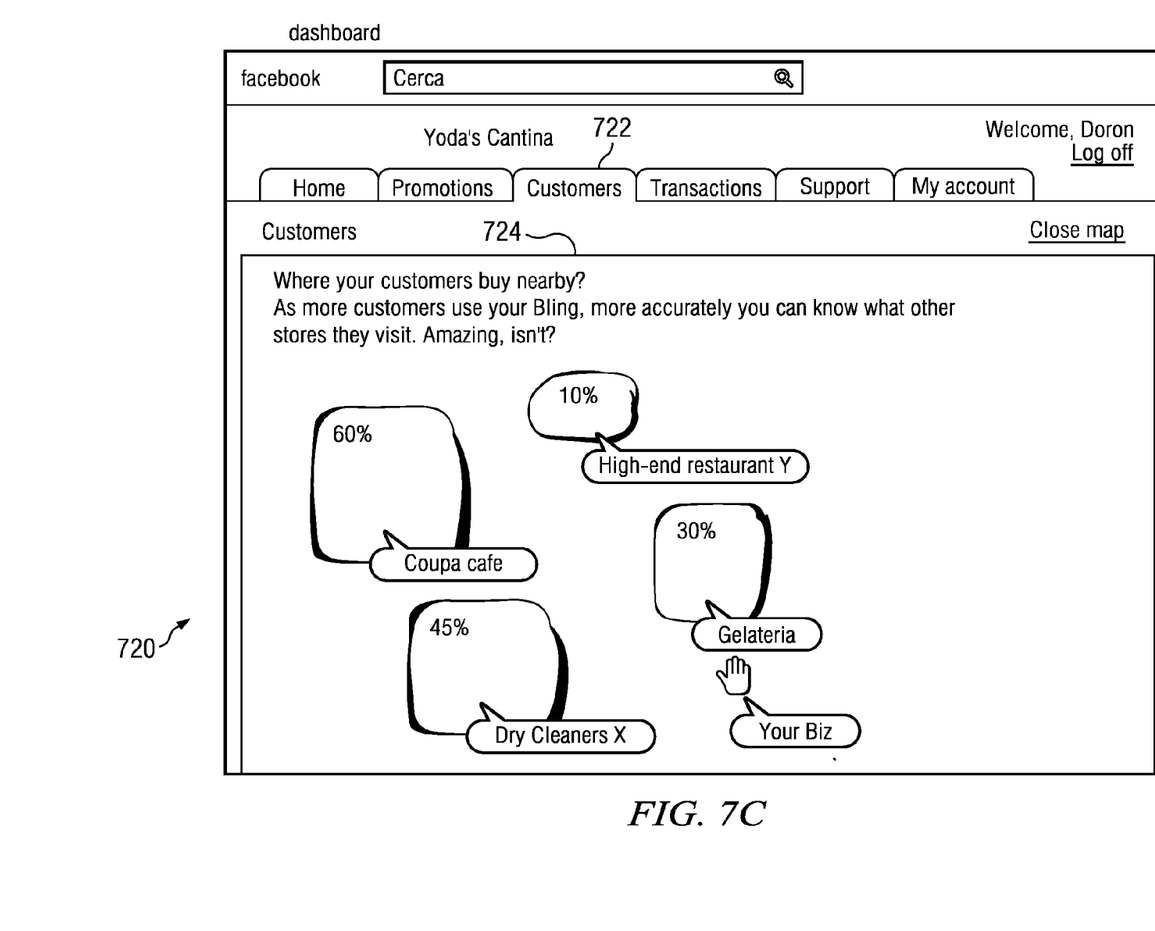

The business dashboard 720 illustrates data 724 provided when a business user selects or navigates to a dashboard customers page 722. The data 724 may include, but is not limited to, customer information including what other area stores your customers are visiting.

Figure 7D:
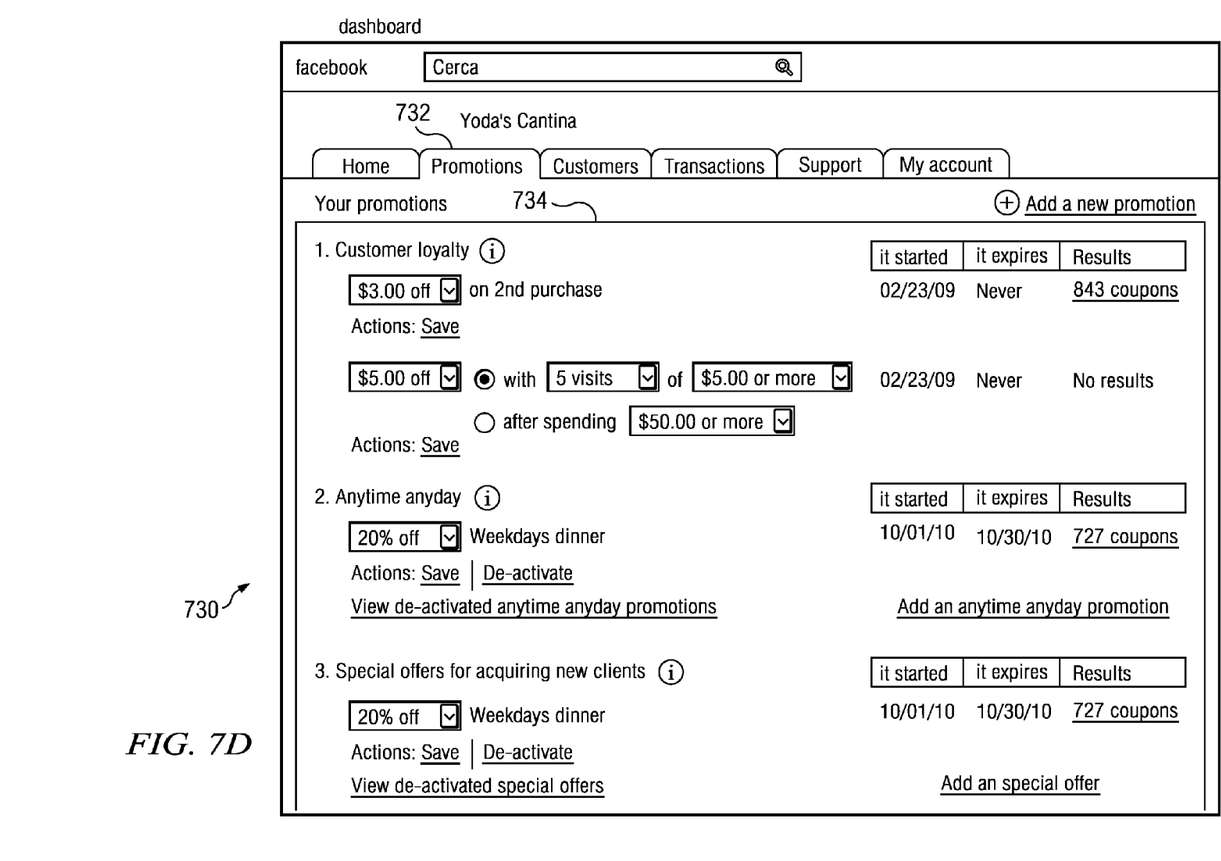

The business dashboard 730 illustrates data 734 provided when a business user selects or navigates to a dashboard promotions page 732. The data 734 may include, but is not limited to, options for the business to create a promotion including customer loyalty promotions, anytime promotions, special offers, etc.

Figure 7E:
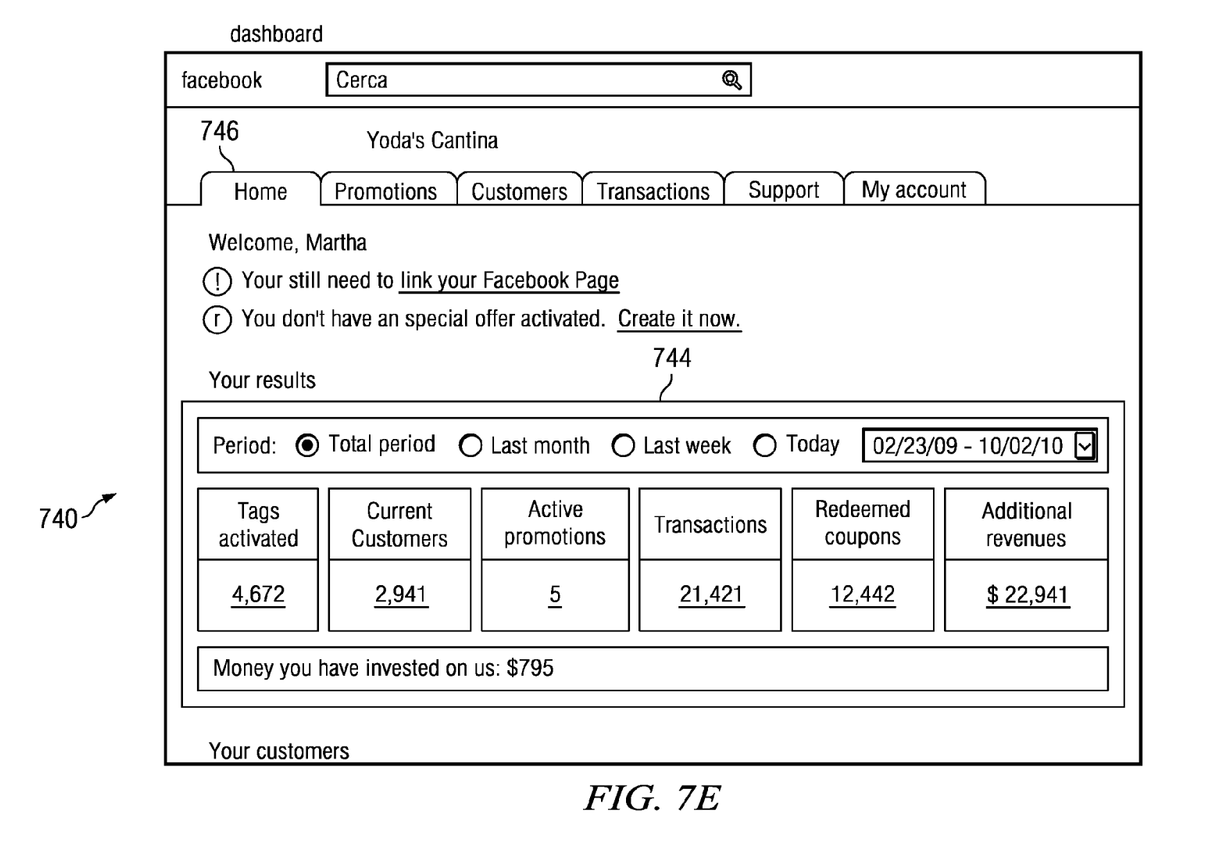

The business dashboard 740 illustrates data 744 provided when a business user selects or navigates to a dashboard home page 742. The data 744 may include, but is not limited to, links for program managers or online systems, links to create a promotion, and a summary of automated transaction system results for the business.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method of providing physical verification for an online check-in process, the method comprising:
    receiving user check-in information at a merchant terminal, the check-in information provided by a user, the merchant terminal located at a merchant location;
    receiving, at an automated transaction system remote from the merchant terminal, the user check-in information;
    requesting permission information via a permission request before transmitting the user check-in information to a social network computer system, the requested permission information being related to check-in information and specific to the social network computer system;
    receiving permission information to transmit the user check-in information to the social network computer system, the received permission information being related to check-in information and specific to the social network computer system;
    establishing a computer communication link from the automated transaction system to the social network computer system comprising social network elements through which multiple users are socially connected by the social network computer system to other users to receive the status updates of other users; and
    transmitting the check-in information from the automated transaction system to the social network computer system, whereby the user's status is automatically updated with at least some of the user-provided check-in information based upon at least some of the received permission information related to check-in information and is provided to multiple users that are socially connected to the user based upon at least some of the received permission information specific to the social network computer system.

2. The method of claim 1, wherein the user check-in information is received via a near-field communication (NFC) interface.

3. The method of claim 1 further comprising storing user permission information in a database, whereby the user check-in information can be transmitted or not transmitted automatically to the social network computer system without further permission requests.

4. The method of claim 1 further comprising updating a database with a total number of visitors to the merchant location.

5. The method of claim 1 further comprising transmitting a coupon based upon the user check-in information and the merchant location.

6. The method of claim 1 further comprising notifying a third-party that the user check-in information has been received.

7. The method of claim 1 further comprising updating a database with purchases made at the merchant location in association with the user check-in information.

8. The method of claim 1, wherein the permission request is a text message transmitted to a mobile device.

9. The method of claim 1, wherein the permission request is presented at the merchant terminal.

10. A method of providing physical verification for an online check-in process, the method comprising:
    receiving user check-in information from a user at a merchant terminal located at a merchant location;
    transmitting permission information in response to a received permission request, wherein the received permission request is:
        related to user check-in information received at an automated transaction system remote from the merchant terminal, the automated transaction system further comprising a database,
        received before the user check-in information is transmitted from the automated transaction system to a social network computer system, and, specific to the social network computer system;

receiving information indicating a result related to the transmitted permission information, the transmitted permission information being related to user check-in information and specific to the social network computer system; and updating user analytics in the database based on the check-in information, wherein the updating is provided based in part upon the received result and is provided via a computer communication link established between the automated transaction system and the social network computer system, wherein the communication link comprises social network elements through which multiple users are socially connected by the social network computer system to other users to receive the status updates of other users, whereby the analytics are automatically updated with at least some of the user-provided check-in information based upon at least some of the requested permission information related to check-in information, and are provided to multiple users that are socially connected to the user based upon at least some of the requested permission information specific to the social network computer system.

11. The method of claim 10 further comprising:
retrieving a social network profile of the user by the automated transaction system; and
updating the social network computer system to indicate that the user is present at the merchant location.

12. The method of claim 10 further comprising:
receiving transaction information from the merchant location; and
coordinating payment for the transaction between the merchant location and a financial institution.

13. The method of claim 10, wherein the permission request is a text message transmitted to a mobile device.

14. The method of claim 10, wherein the permission request is presented at a merchant terminal at the merchant location.

* * * * *